Reissued Dec. 18, 1951 Re. 23,443

UNITED STATES PATENT OFFICE 23,443

METHOD OF PRODUCING ETHERS AND ESTERS OF CARBOHYDRATES

Jan Lolkema, Hoogezand, Netherlands; vested in the Attorney General of the United States No Drawing. Original No. 2,459,108, dated January 11, 1949, Serial No. 380,562, February 25, 1941. Application for reissue October 14, 1949, Serial No. 121,443. In the Netherlands January 23, 1940

Section 3, Public Law 690, August 8, 1946
Patent expires January 23, 1960

9 Claims. (Cl. 260—233.3)

Matter enclosed in heavy brackets [ ] appears in the original patent but forms no part of this reissue specification; matter printed in italics indicates the additions made by reissue.

The invention relates to a method of producing ethers, esters and mixed ether-esters of carbohydrates, more particularly of starch in a dry form which are soluble in cold or in hot water or in both.

There are already known several methods of producing alkyl ethers of starch. In general they are obtained by treating an aqueous suspension or paste of the starch with the alkylating agent, e. g. an alkyl sulphate, in the presence of a substance having an alkaline reaction. According to these methods the ethers are generally obtained in the form of colloidal solution or pastes which can be used as adhesives. The production of the solid ethers in a dry condition from these reaction products is known likewise; for this purpose, however, comparatively laborious and expensive treatments were necessary, such as e. g. precipitation with alcohol, separation by dialysis or separation by adding inorganic salts with subsequent filtering, washing and drying. The products thus obtained were readily soluble in cold water, but only slightly soluble in hot water. Up to the present the said starch ethers have been but little used for technical purposes, which is partly due to the laborious methods of producing the same.

The production of [ethers of other carbohydrates and of esters of carbohydrates] *starch esters* is also known. Up to the present, however, they have also proved to be of small importance in actual practice.

The present invention relates to a method which renders it possible to produce in a very simple and economical manner from starch and other carbohydrates which may be made into a solution or paste by stirring them with a small proportion of water, ethers, esters and mixed ether-esters in the form of dry flakes or powders which are readily soluble in cold and/or hot water. This method consists in that a mixture of the carbohydrate with a limited quantity of water *etherifying or esterifying agent and an alkaline substance* either after the etherification or esterification or in any desired stage of the said processes, is suddenly heated for a short time to a high temperature and pressed out or spread out to form [their] *thin* layers which are simultaneously dried. If gelatinizable carbohydrates are used as a starting material the reaction mixture is preferably heated to a temperature above the gelatinizing temperature.

The invention is chiefly important for the production of valuable products from starch or starch containing materials and starch derivatives, but it may also serve for the production of ethers and esters from other polysaccharides which likewise will produce viscous, sticky solutions both in cold and hot water.

The invention will now be described with regard to the production of starch ethers.

According to an embodiment of the invention the starch is first mixed with a small proportion of water (i. e. the proportion usual for the production of cold swelling starch) and with the chemicals required for etherification and, preferably after the etherification process has proceeded to a smaller or larger extent, subjected to the heating process described above.

This process may be carried out by stirring the starch e. g. with from ½–2 parts by weight of water and subsequently adding the quantity of the alkaline substance required for the reaction. As such e. g. alkali hydrates, salts having an alkaline reaction, ammonia or organic bases may be used. The addition of the said alkaline substances is necessary in most cases for effecting the reaction with the etherifying agent.

The etherifying agent e. g. a dialkyl sulphate is now added to the said mixture while stirring. In order to accelerate the reaction, the reaction mixture may be heated, but since the reaction is exothermic, this generally will not be necessary and in some cases cooling is even advisable, in order to retard the reaction.

The mixture is now suddenly heated during a short time to a high temperature and pressed or spread out to form thin layers which are simultaneously dried. This operation which is well known from the manufacturing processes of cold swelling starch of which it forms an essential part, is preferably carried out by applying the mixture to rotating cylinders heated to a temperature of 100° C. or above, which are positioned so that the mass is pressed into a thin layer. The starch will thereby be gelatinized in so far as gelatinizing has not yet been effected by the alkali during the pre-treatment, and simultaneously dried, so that the material leaving the cylinders will consist of thin sheets or chips which may be ground, if desired.

Before the mass is submitted to this treatment, a more or less advanced etherification of the starch has already taken place; preferably operations are carried out in such a way that the reaction will be accomplished for three quarters or more before the material is heated and dried on the cylinder.

During this latter treatment the etherification process will proceed, particularly because of the fact that owing to the evaporation of the water the concentration of the unreacted part of each component will increase very quickly, whereby the reaction will be considerably accelerated. It has accordingly been found that the etherificaton process is completed within a short time and that in a few minutes a dry product of the desired degree of etherification is obtained. The method according to the invention therefore renders it possible to utilize the etherifying agent as completely as possible in a very simple and inexpensive way.

Instead of immediately adding the entire quantity of alkaline substance to the starch-water mixture, it is also possible to add the same entirely or partly together with the etherifying agent. It is also possible first to mix the starch with the water and the etherifying agent and subsequently to add the required quantity of the alkaline substance.

The etherifying agent may be diluted, if desired, with a solvent; this solvent, however, must not have too high a boiling point, as it will have to evaporate again during the treatment on the cylinders.

[The alkyl groups furthermore may have straight or branched chains which may be interrupted by oxygen, nitrogen or sulphur.]

[The starch may also be etherified with different groups. In that case the starch is reacted with two or more etherifying agents which may be added either simultaneously or successively and in any desired sequence, either in immediate succession or at given intervals. Examples of such mixed starch ethers are the methyl-ethyl ether and the methyl-hydroxy.2 ethyl ether.]

[When using the term "ethers of carbohydrates" in the specification and claims I only mean those compounds in which one carbon atom does not contain more than one hydroxy alkyl group and it therefore does not include the compounds known under the name "acetales" which are obtained by reacting aldehydes of ketones with hydroxy compounds, e. g. the condensation products of carbohydrates with formaldehyde.]

[The invention has been described above for the production of starch ethers, but the esters may also be prepared in a similar manner, e. g. by mixing the starch with a small proportion of water and an alkaline substance, subsequently adding an acid chloride and after the reaction has proceeded for a considerable part, heating the mixture on cylinders in the manner described above.]

[The esters used according to the invention are derived from polybasic inorganic or from mono- or from polybasic organic acids, e. g. aliphatic or aromatic acids, which may also contain one or more of the above mentioned substituents. The term "esterifying agents" when used in the specification and claims is not meant to include carbon disulphide, which, although it is not an esterifying agent in the usual sense, is capable of forming xanthates when mixed with carbohydrates in the presence of alkali.]

[Furthermore it is also possible to produce mixed etheresters by treating the starch both with etherifying and esterifying agents. If the addition of the esterifying agent occurs simultaneously with or after the addition of the etherifying agent, the esterifying agent may react with free hydroxyl groups of the starch as well as with certain groups, e. g. hydroxyl or amino groups present in the etherifying agent either before or after esterification, or with both.]

The best known and chiefly used etherifying agents are the esters of the corresponding alcohols e. g. with acids such as sulphuric acid. In the etherifying process this acid will be partly or entirely liberated and for this reason it is generally necessary to add alkaline substances which combine with the acid. It is, however, also possible to employ etherifying agents which do not produce acids, such as the epoxy alkanes. Nevertheless it will be advantageous in this case also to add alkaline substances as they will act as catalysts. After the reaction has been completed, the alkaline substance may be partly or completely neutralized.

The alkyl groups which may be combined with the starch by the etherifying process may be of a varying character and they may contain various substituents, e. g. one or more hydroxyl groups, mercapto groups, rhodanide groups, halogen atoms, amino or substituted amino groups, carboxyl groups or arylcarboxyl groups or alkali salts respectively, alkaline earth salts or other salts or functional derivatives thereof, such as amides and substituted amides, sulphonic acid groups or aryl sulphonic acid groups, or salts or functional derivatives thereof and the like.

*The alkyl groups furthermore may have straight or branched chains which may be interrupted by oxygen, nitrogen or sulphur.*

*The starch may also be etherified with different groups. In that case the starch is reacted with two or more etherifying agents which may be added either simultaneously or successively and in any desired sequence, either in immediate succession or at given intervals. Examples of such mixed starch ethers are the methyl-ethyl ether and the methyl-hydroxy.2 ethyl ether.*

*When using the term "ethers of carbohydrates" in the specification and claims I only mean those compounds in which one carbon atom does not contain more than one hydroxy alkyl group and it therefore does not include the compounds known under the name of "acetales" which are obtained by reacting aldehydes of ketones with hydroxy compounds, e. g. the condensation products of carbohydrates with formaldehyde.*

*The invention has been described above for the production of starch ethers, but the esters may also be prepared in a similar manner, e. g. by mixing the starch with a small proportion of water and an alkaline substance, subsequently adding an acid chloride and after the reaction has proceeded for a considerable part, heating the mixture on cylinders in the manner described above.*

*The esters used according to the invention are derived from polybasic inorganic or from mono- or from polybasic organic acids, e. g. aliphatic or aromatic acids, which may also contain one or more of the above mentioned substituents. The term "esterifying agents" when used in the specification and claims is not meant to include carbon disulphide, which, although it is not an esterifying agent in the usual sense, is capable of form-*

*ing xanthates when mixed with carbohydrates in the presence of alkali.*

*Furthermore it is also possible to produce mixed etheresters by treating the starch both with etherifying and esterifying agents. If the addition of the esterifying agent occurs simultaneously with or after the addition of the etherifying agent, the esterifying agent may react with free hydroxyl groups of the starch as well as with certain groups, e. g. hydroxyl or amino groups present in the etherifying agent either before or after etherification, or with both.*

Similar derivatives as described above in connection with starch may also be produced from starch products as soluble starch, dextrine and the like, and from other carbohydrates, such as inuline, sugars, different kinds of gums, such as gum arabic, and the like, in so far as they can be made into a solution or paste by stirring the same with a small proportion of water, and the products thus obtained are likewise soluble in cold and/or hot water. By a small proportion of water I mean the proportion generally used in the manufacture of cold swelling starch. Of course mixtures of different carbohydrates may also be used as starting materials.

The methods of production described above are extremely simple, practical and far less laborious than the methods used up to the present, which renders the final products less expensive.

When compared with the usual starch products used for technical purposes e. g. the well known soluble starches, cold swelling starches, dextrines and the like, the starch ethers and esters according to the invention have different properties, which give them special advantages for various purposes. Depending on the nature and/or the quantity of the etherifying or the esterifying agent used per unit of glucose, one obtains products which dissolved in water to a colloidal solution will show a great variation in regard to viscosity. The said viscous colloidal solutions are characterized by a gum-like character and a great and lasting transparency; they do not show retrogradation phenomena and in many cases will possess a better solubility and a strong adhesive power.

They furthermore have the advantage that they are not substantially attacked by microorganisms, so that practically no preservatives need be added to the adhesives produced from the said ethers and esters. Moreover the starch products thus produced will practically form no lumps when dissolved in cold water, a drawback which as is known, is generally inherent to cold swelling starch products.

I claim:

[1. The process of manufacturing adhesive alkyl ethers of a gelatinizable carbohydrate soluble in water to form a paste which comprises mixing the carbohydrate with an alkaline solution and an etherifying agent, spreading the mixture to form a thin layer and quickly heating the layer to a gelatinizing temperature while evaporating the solution to accelerate the etherification.]

[2. The process of manufacturing adhesive alkyl ethers of starch soluble in water to form a paste which comprises mixing the starch with an alkaline solution and an etherifying agent, spreading the mixture to form a thin layer and quickly heating the layer to a gelatinizing temperature while evaporating the solution to accelerate the etherification.]

[3. The process of manufacturing adhesive alkyl ethers of starch soluble in water to form a paste which comprises mixing the starch with an alkaline solution and an etherifying agent, spreading the mixture to form a thin layer and quickly heating the layer to approximately 100° C. until dry.]

[4. The process of manufacturing adhesive alkyl ethers of starch soluble in water to form a paste which comprises mixing the starch with an alkali hydrate and an etherifying agent, spreading the mixture to form a thin layer and quickly heating the layer to approximately 100° C. until dry.]

[5. The process of manufacturing an adhesive ether of starch soluble in water to form a paste which comprises mixing the starch with an alkaline solution and diethyl sulphate, spreading the mixture to form a thin layer and quickly heating the layer to approximately 100° C. until dry.]

[6. The process of manufacturing an adhesive ether of starch soluble in water to form a paste which comprises mixing the starch with an alkali hydrate and diethyl sulphate, spreading the mixture to form a thin layer and quickly heating the layer to approximately 100° C. until dry.]

[7. The process of manufacturing an adhesive ether of starch soluble in water to form a paste which comprises mixing the starch with an alkaline solution and an etherifying agent and quickly pressing a thin layer of the mixture between surfaces heated to 100° C.]

[8. The process of manufacturing an adhesive ether of starch soluble in water to form a paste which comprises mixing the starch with an alkaline solution and an etherifying agent and quickly pressing a thin layer of the mixture between two rotating cylinders heated to 100° C.]

[9. The process of manufacturing an adhesive ether of starch soluble in water to form a paste which comprises mixing the starch with an alkaline solution and an etherifying agent, spreading the mixture to form a thin layer and completing the etherification by heating the layer to 100° C. until dry.]

*10. The process of manufacturing water soluble adhesive derivatives of polysaccharides, which in unreacted condition are soluble in water to form a paste which comprises mixing the polysaccharide with an alkaline solution and a reagent of the group consisting of etherifying organic esters of inorganic acids, etherifying epoxyalkanes and esterifying agents derived from organic acids, spreading the reaction mixture to form a thin layer and quickly heating the layer to at least 100° C., while evaporating the solution.*

*11. The process of manufacturing water soluble adhesive derivatives of gelatinizable polysaccharides, which in unreacted condition, are soluble in water to form a paste which comprises mixing the gelatinizable polysaccharide with an alkaline solution and a reagent of the group consisting of etherifying agents and etherifying organic esters of inorganic acids, etherifying epoxyalkanes derived from organic acids, spreading the reaction mixture to form a thin layer and quickly heating the layer to at least 100° C., while evaporating the solution.*

*12. The process of manufacturing water soluble adhesive starch derivatives which comprises mixing the starch with an alkaline solution and a reagent of the group consisting of etherifying organic esters of inorganic acids, etherifying epoxyalkanes and esterifying agents derived from organic acids, spreading the reaction mixture to*

*form a thin layer and quickly heating the layer to at least 100° C. until dry.*

*13. The process of manufacturing water soluble adhesive starch derivatives which comprises mixing the starch with an alkali hydrate and a reagent of the group consisting of etherifying organic esters of inorganic acids, etherifying epoxyalkanes and esterifying agents derived from organic acids, spreading the reaction mixture to form a thin layer and quickly heating the layer to at least 100° C. until dry.*

*14. The process of manufacturing water soluble adhesive starch derivatives which comprises mixing the starch with an alkaline solution and diethyl sulphate, spreading the reaction mixture to form a thin layer and quickly heating the layer to at least 100° C. until dry.*

*15. The process of manufacturing water soluble adhesive starch derivatives which comprises mixing the starch with an alkali hydrate and diethyl sulphate, spreading the reaction mixture to form a thin layer and quickly heating the layer to at least 100° C. until dry.*

*16. The process of manufacturing water soluble adhesive starch derivatives which comprises mixing the starch with an alkaline solution and a reagent of the group consisting of etherifying organic esters of inorganic acids, etherifying epoxyalkanes and esterifying agents derived from organic acids and quickly pressing a thin layer of the reaction mixture between surfaces heated to at least 100° C.*

*17. The process of manufacturing water soluble adhesive starch derivatives which comprises mixing the starch with an alkaline solution and a reagent of the group consisting of etherifying organic esters of inorganic acids, etherifying epoxyalkanes and esterifying agents derived from organic acids and quickly pressing a thin layer of the reaction mixture between rotating cylinders heated to at least 100° C.*

*18. The process of manufacturing water soluble adhesive starch derivatives which comprises mixing the starch with an alkaline solution and a reagent of the group consisting of etherifying organic esters of inorganic acids, etherifying epoxyalkanes and esterifying agents derived from organic acids, spreading the reaction mixture to form a thin layer and completing the etherification by heating the layer to at least 100° C. until dry.*

JAN LOLKEMA.

REFERENCES CITED

The following references are of record in the file of this patent or the original patent:

UNITED STATES PATENTS

| Number | Name | Date |
|---|---|---|
| 1,805,365 | Huber | May 12, 1931 |
| 1,979,257 | Giesicke | Nov. 6, 1934 |
| 2,116,867 | Kreimeier et al. | May 10, 1938 |
| 2,148,951 | Maxwell | Feb. 28, 1939 |
| 2,222,872 | Luick | Nov. 26, 1940 |
| 2,288,200 | Meyer | June 30, 1942 |

OTHER REFERENCES

American Dyestuff Reporter, June 19, 1933, p. 379, by Hall-Huntress. Problems in Organic Chemistry, page 71, McGraw-Hill (1938).